(12) United States Patent
Shu

(10) Patent No.: US 11,685,679 B2
(45) Date of Patent: Jun. 27, 2023

(54) 100 % RENEWABLY -POWERED DESALINATION /WATER PURIFICATION STATION

(71) Applicant: Jianchao Shu, Cypress, TX (US)

(72) Inventor: Jianchao Shu, Cypress, TX (US)

( * ) Notice: Subject to any disclaimer, the term of this patent is extended or adjusted under 35 U.S.C. 154(b) by 32 days.

(21) Appl. No.: 17/352,318

(22) Filed: Jun. 20, 2021

(65) Prior Publication Data

US 2022/0402793 A1 Dec. 22, 2022

(51) Int. Cl.

| | | |
|---|---|---|
| *C02F 9/00* | (2023.01) | |
| *B01D 1/00* | (2006.01) | |
| *B01D 5/00* | (2006.01) | |
| *B01D 61/00* | (2006.01) | |
| *B01D 61/02* | (2006.01) | |
| *B01D 61/08* | (2006.01) | |
| *C02F 1/00* | (2023.01) | |
| *C02F 1/14* | (2023.01) | |
| *C02F 1/44* | (2023.01) | |
| *C02F 103/08* | (2006.01) | |
| *C02F 1/04* | (2023.01) | |

(52) U.S. Cl.
CPC .............. *C02F 9/00* (2013.01); *B01D 1/0005* (2013.01); *B01D 1/0035* (2013.01); *B01D 5/006* (2013.01); *B01D 61/002* (2013.01); *B01D 61/025* (2013.01); *B01D 61/08* (2013.01); *B01D 2311/2649* (2013.01); *B01D 2311/2669* (2013.01); *B01D 2313/243* (2013.01); *B01D 2313/365* (2013.01); *C02F 1/004* (2013.01); *C02F 1/047* (2013.01); *C02F 1/14* (2013.01); *C02F 1/441* (2013.01); *C02F 1/445* (2013.01); *C02F 2103/08* (2013.01); *C02F 2201/009* (2013.01)

(58) Field of Classification Search
None
See application file for complete search history.

(56) References Cited

U.S. PATENT DOCUMENTS

| | | | |
|---|---|---|---|
| 5,672,250 A | 9/1997 | Ambadar | |
| 6,100,600 A * | 8/2000 | Pflanz | C02F 1/441 |
| | | | 299/9 |
| 2005/0236840 A1* | 10/2005 | Stark | F03B 3/00 |
| | | | 290/53 |

(Continued)

*Primary Examiner* — Krishnan S Menon

(57) ABSTRACT

The invention relates to 100% renewably-powered desalination/water purification stations for universal applications, the station is disruptive, scalable, amphibious and deportable to seawater, brackish or spill oil sites for simple wave-powered and autonomous operations, the station has a mooring assembly with pumping-purification-delivery subsystems powered by wave and solar energies, the pumping subsystems has the simplest, most efficient wave push/pull pump mechanisms powered by amplified wave centrifugal forces , the mechanical purifications has turbine filters, reverse-osmosis filters, forward-osmosis filters and relief valves to backwash buildups without releasing brine, release water through collecting spill oil, the solar thermal purifications are provided with distilling processes under vaccine conditions, the delivery subsystems with wave turbines and solar panels for generating electricity, propellering and transferring the stations for delivering fresh waters to destinations under GPS guide with the lowest LCOW.

9 Claims, 8 Drawing Sheets

(56) References Cited

U.S. PATENT DOCUMENTS

Figure 1:
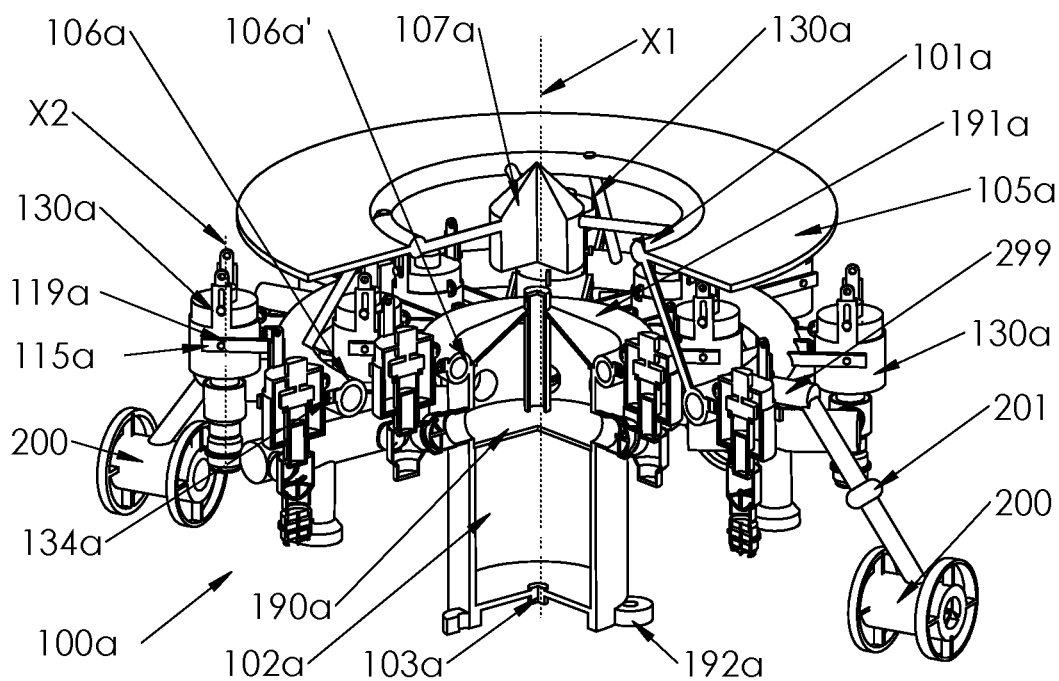

| | | | |
|---|---|---|---|
| 2010/0193447 A1* | 8/2010 | Marcum | C02F 1/441 |
| | | | 210/259 |
| 2012/0085108 A1 | 4/2012 | Nirmalakhandan | |
| 2016/0075569 A1* | 3/2016 | Constantz | C02F 1/441 |
| | | | 210/652 |
| 2017/0145984 A1 | 5/2017 | Matthews | |
| 2018/0058440 A1* | 3/2018 | Knowles, Jr. | F04B 23/06 |
| 2019/0151798 A1* | 5/2019 | Lafortune | B01D 61/04 |
| 2020/0189933 A1* | 6/2020 | Yang | B01D 5/006 |
| 2021/0146307 A1* | 5/2021 | Dehlsen | B01D 61/10 |
| 2022/0282697 A1* | 9/2022 | Novek | C02F 1/441 |

\* cited by examiner

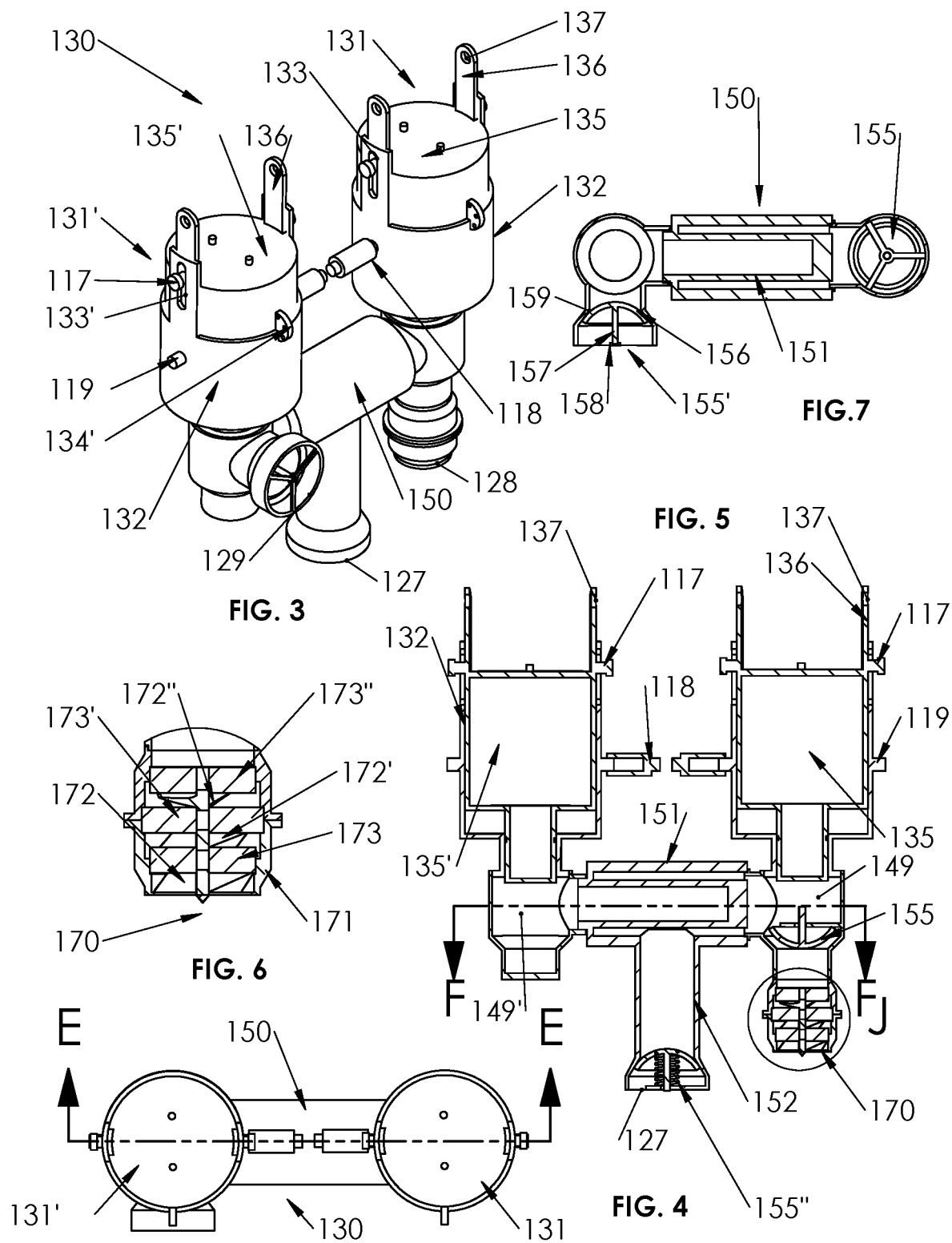

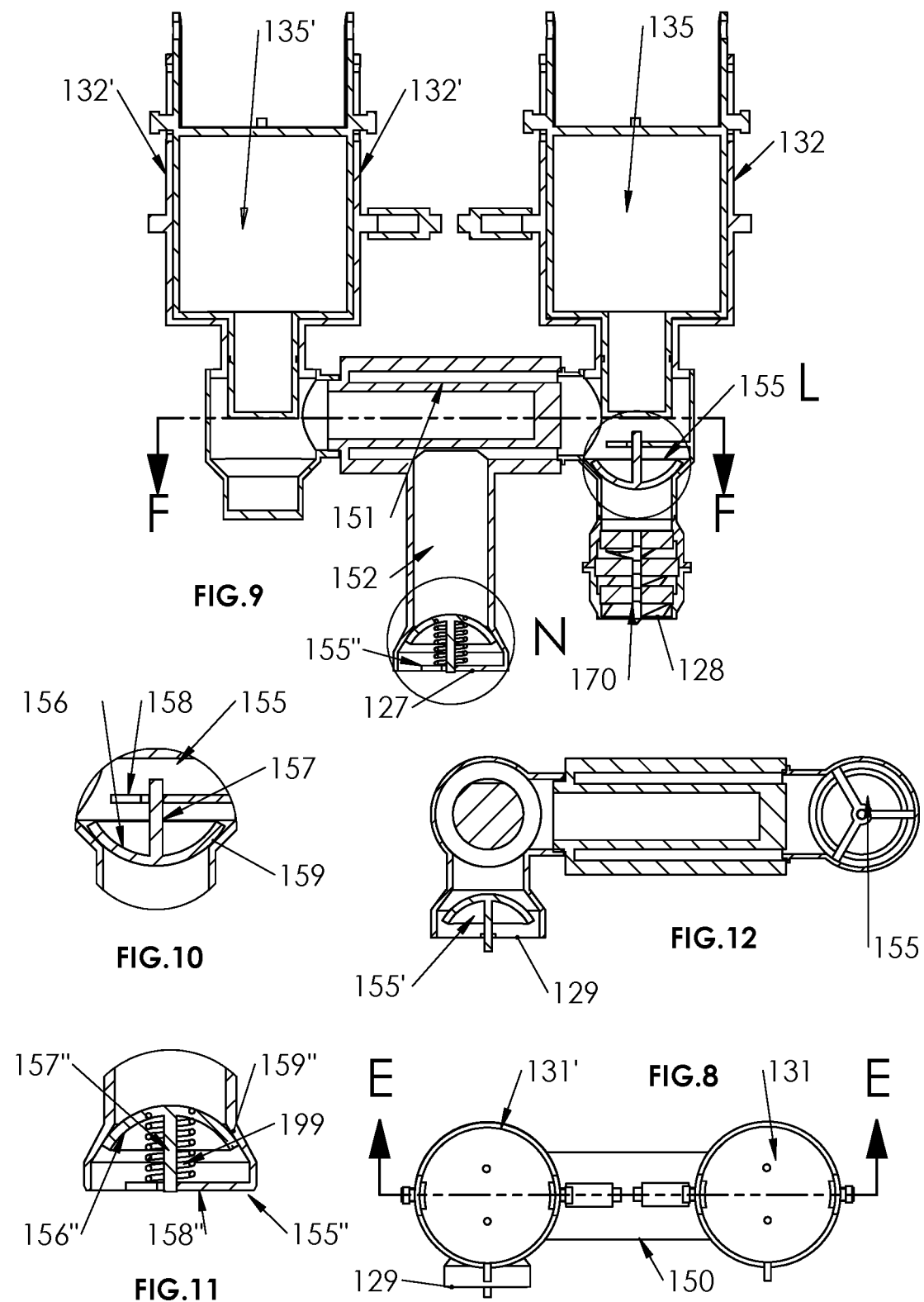

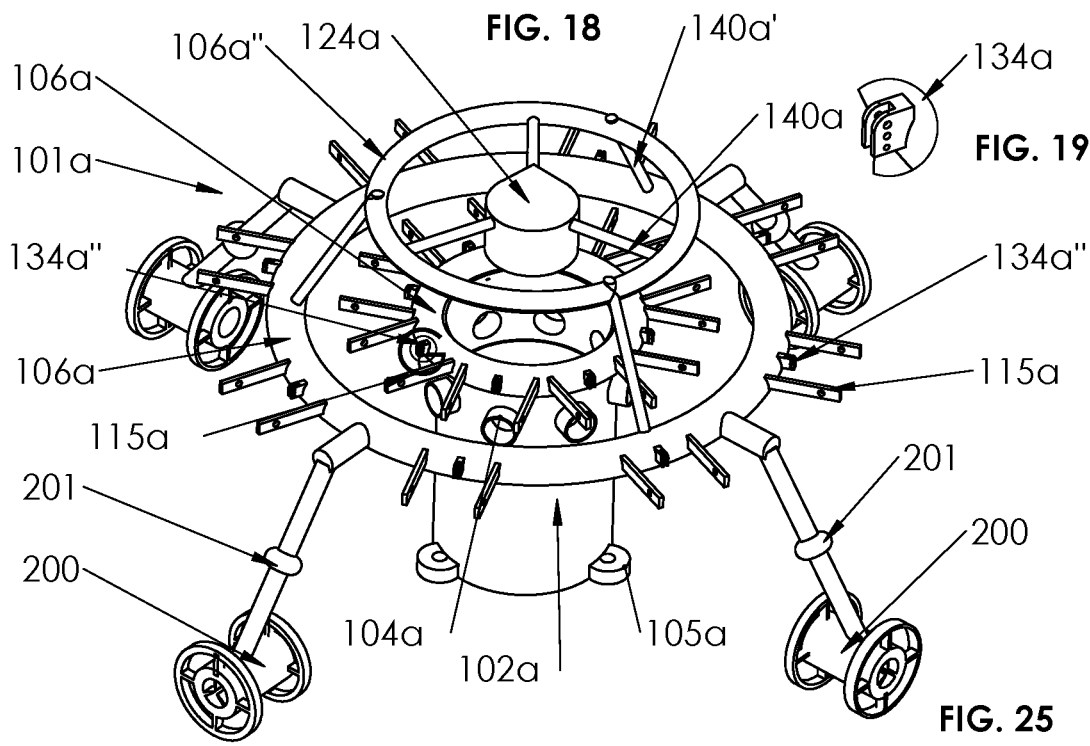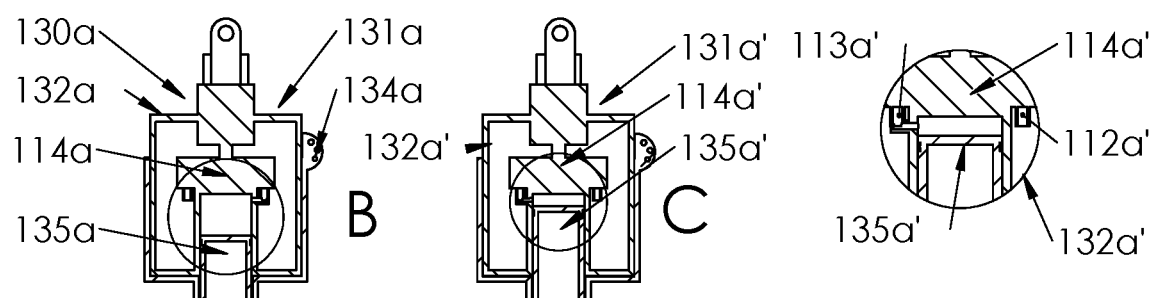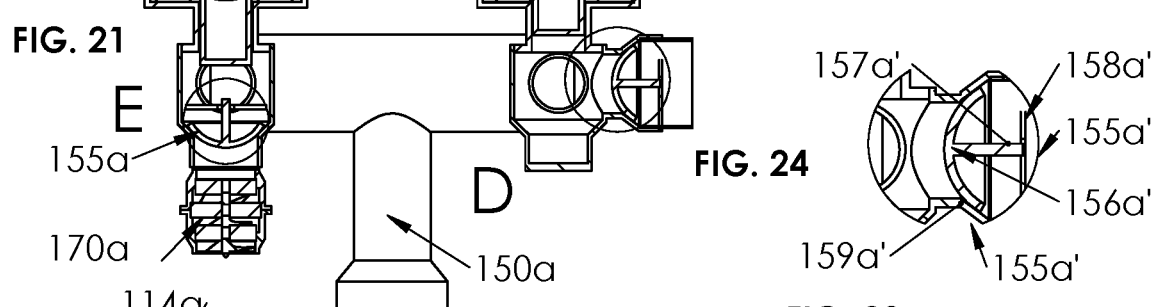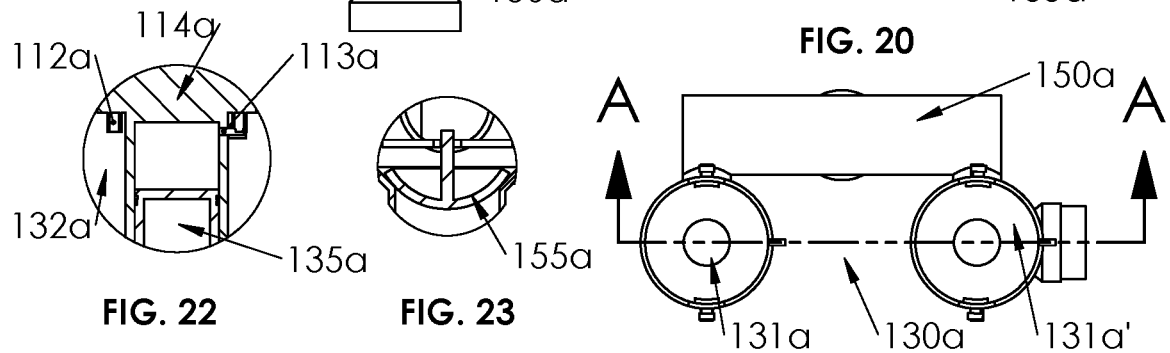

100 % RENEWABLY -POWERED DESALINATION /WATER PURIFICATION STATION

CROSS-REFERENCE TO RELATED APPLICATION

This application claims the benefit of provisional patent application Ser. No. 63/044,342 filed on Jun. 25, 2020 by the present inventor.

FEDERALLY SPONSORED RESEARCH

No

SEQUENCE LISTING OR PROGRAM

No

BACKGROUND

The invention relates to 100% renewably-powered desalination/water purification stations for universal applications, the station is disruptive, scalable, amphibious and deportable to seawater, brackish or spill oil sites for simple wave-powered and autonomous operations, the station has a mooring assembly with pumping-purification-delivery subsystems powered by wave and solar energies, the pumping subsystems has the simplest, most efficient wave push/pull pump mechanisms powered by amplified wave centrifugal forces, the mechanical purifications has turbine filters, reverse-osmosis filters, forward-osmosis filters and relief valves to backwash buildups without releasing brine, release water through collecting spill oil, the solar thermal purifications are provided with distilling processes under vaccine conditions, the delivery subsystems with wave turbines and solar panels for generating electricity, propellering and transferring the stations for delivering fresh waters to destinations under GPS guide with the lowest LCOW.

Water scarcity in the U.S. and around the globe is becoming a significant problem due to limited availability of freshwater resources and the high cost of transporting fresh water from distant sources to water demand areas. This situation has led to a renewed focus on developing seawater and brackish water as alternative sources of potable water. In addition, water infrastructure energy use and the carbon footprint of water consumption have both emerged as critical issues. Therefore, water and energy nexus implications are integral to the feasibility of developing seawater and brackish water, so desalination has evolved into a viable water supply alternative allowing tapping the largest water reservoir in the world to solve water scarcity—the ocean. Seawater desalination technology, available for decades, has made great strides in many arid areas of the world such as the Middle East, the Mediterranean, Australia and the Caribbean.

The conventional desalination process includes seawater desalination, brackish groundwater and brine desalination, the desalination plants operate in more than 120 countries in the world, including Saudi Arabia, Oman, United Arab Emirates, Spain, Cyprus, Malta, Gibraltar, Cape Verde, Portugal, Greece, Italy, India, China, Japan, and Australia. The largest Seawater Desalination Plant in the Americas came online in 2015 in Carlsbad, Calif. producing 50 million gallons per day. Worldwide, desalination plants produce over 3.5 billion gallons of potable water a day. The installed reverse osmosis (RO) desalination plant capacity has increased in an exponential scale over the last 30 years, but there are some challenges and barriers.

1. Low Efficiency

The conventional desalination process have low efficiency for the pumping system, the purification and the delivery system (a) first the pumping system has a low pressure subsystem for pumping in the seawater and pumping out the brine, which add no value but waster tremendous energy and a high pressure subsystem for filtering by dumping the high pressure brine even with cycle process which wasters energy too, second the conventional pumps waste great energy with the conventional design that the rotor volume is much larger than a carrying fluid volume about twice so every HP only has 1/3 power to pump the fluid and other 2/3 power to rotate the rotor with adding value, which waste, if we consider all electricity from power plant to desalination plant with other 15% waste, not even mention how much water the power plants consume, what a waste, this low efficient processes are not sustainable !! (b) the purifications need more useful energy with high pressure (at least 870 psi or 60 bar) process to remove solid particles and salts, according to the conversation of energy, there are pressure loss through the process, even the RO filters have been improved greatly for last 30 years but the basic structures with arrange of pipes are not changed too much, in other word, there is not too much synergy, every drop fresh water still come through the single pipe with single RO filter to form fresh water stream for pumping out to a city water pipeline, but for removing salts and preventing fouling, there are nothing new, here is cath22, if the RO filters are not replaced on time then the buildup on RO filters would not only cause high pressure drop and reduce the filtering efficiency, but also increase operation cost, if the RO filters are replaced to keep high efficiency, then RO filters cost would increase too, finally as far the delivery system is concerned the delivery system wastes energy too, the desalination plants have inherent problem for the locations near coast areas, so the water delivery system would take inefficient route and unavoidably waste great energy to deliver water unlike the conventional city water treatment plants are located near city centers with existing waterline and local water towers.

2. High Construction Cost

The desalination process is a process control system and includes (a) a pumping subsystem with inlet and outlet or thermal process (b) a filleting/desalination subsystem (c) a facility. Historically, the key concern related to the use of seawater desalination in a large scale has been the high cost of water production for construction and operation, like the Carlsbad Desalination Plant, the construction cost was $1 billion dollars with 50 million US gallons (190,000 m3) per day (190 megacities), the 2010 biennial report on seawater desalination projected that it will cost approximately $32 million to build a 2.5 MGD seawater desalination plant, and approximately $658 million to build a 100 MGD seawater desalination plant in Texas. The construction cost of the desalination plant is very costly; the foundational problem for the construction of the desalination plants is a structural problem. The desalination plants is based on the modern centralized water process system instead of an unique desalination system, the conventional water process centers are located at a center of these water distribution systems and include from water sources return pipelines or water tower output pipelines and process center, those modern water systems have been built for 100 years ago during urbanizing regardless where the cities are located. So the difference is (1) location, the desalination plants are located to the coastal areas, out of the modem water distribution system, while the conventional water process center is located center of the water distribution system, so the delivery cost would increase (2) the centralized desalination plants have not benefit of economics of scale in the conventional water process system (a) intake pump system is dependent on the length of pipes and flow rate, so as the flow rate increases, the intake pump capacity increases (b) the control center cost is a synergic cost but it account for less than 10% of the total cost (c) the desalination system is dependent on the length of pipes and flow rate so as the flow rate increases, the capacity of the filleting process increases (d) the filleting subsystem includes a pre-filleting assembly, a filleting assembly and post-filleting assembly, the filleting capacity is dependent on the filleting areas and flow rate and fluid pressure so as the flow rate increases the pump capacity increases, as a result, the current desalination plant model are based on a wrong business model and is not sustainable.

3. High Operation Cost

The desalination process is an energy intensive process, so the operation cost for current desalination plants is very high, even though the membranes have been improved greatly over the last 20 years. The energy cost accounts for 30 to 40% of the total operation cost, the maintenance cost account for 20 to 25% of the total operation cost. A conglomerate of California-based environmentalist groups, the Desal Response Group, claimed that the plant will cost San Diego County $108 million a year. The operation cost of Ocean desalination is between $2,000 and $2,500 an acre-foot, Mills noted. Brackish desalination can range from $1,000 to $2,000. On average 1 gallon of fresh water can be produced from 2 gallon seawater, finally fouling or salt buildups for reverse osmosis filters are a major issue for the process performance and operation cost in the desalination plants, with salt buildups, the process performance would reduce more than 15%, while the replacements of reverse osmosis filters, the cost labor and reverse osmosis filters would add other cost with more than 150% over the existing reverse osmosis filters, so far there is no solution in the desalination industries around the world.

4. Brine Disposals

The brine disposal is a real environmental problem that should be considered and studied when installing a desalination plant. In most cases, the easiest way to get rid of the important brine flow (70 to 55% of intake flow) is to discharge it in the sea via a brine outfall pipe. Brine concentration varies from 50 to 75 g/L and has a much higher density than seawater and therefore tends to fall on the sea floor near the brine outfall outlet (plume effect), creating a very salty layer which can have negative impacts on the flora and the marine life and any related human activities. As a result, the Brine disposal not only increase greatly cost, but also raise real environmental problem, the long term effect still remains to be seen.

5. Lack of Scalability

All current processes around the world are not scalable from small projects in ocean to coastal cities water systems, they not only increase investment cost and risk,but also prolong project times, more importantly, as those coastal city populations increase, those processes cannot scale up to meet the demand, as a result, the new plants have be built and the old plants have to be demonized, they happen all the time around the world, the root cause for it is the process technology which is not scalable, so the cost for each system is very high without synergies those systems have own designs and cost structures without modulations, on the other hand, each processes can be only used for any level of salinity, if a plant is designed for the brine water with 50+ ppt desalination,then this plant cannot purify the saline water with 30-50 ppt and the brackish water with 0.5 to 30 ppt, the lack of scalability not only limit the plant capability, but also greatly increase the investment and levelized cost of water, so far there are no solutions,, if this plant was designed for all levels of salinity, then cost would become unbearable.

6. Renewable Energy Usage

Renewable energy has been used for desalination/water purification for more than 20 years, but in general, those applications are inefficient in small scales, most of them are solar thermal based processes, because with conventional solar thermal distilling the temperature has to reach 1000, then the seawater would boil, so the collecting methods have been improved but the basic distilling has been changed for more 800 years, as far as the wave powered applications are not even commercialized at this point, the reason is that so far there is no workable wave power converting machine invented directly or indirectly to power the desalination plants or processes for mechanical purifications, those machines have too much converting mechanisms at least three, so those machines not only produce a few power with free form of wave but also cannot sustain the violent wave impact as a result constantly repair and replacements are required, the cost has reach at the level what the machine become iinaffordab1e even with government subsides.

In conclusion, insofar as I am aware, no such a system is formerly developed with new machines to solve the problems.

SUMMARY

The invention relates to the renewably-powered desalination/water purification station and farm, the station is scalable and based on the modularized design, and can be used as a marine survivor shelter or personal use, the station is used for large scale commercial or military propose, the station has a pumping subsystem and a purification subsystem powered by a wave energy or solar energy. The pumping subsystem includes at least two pulling/pushing pressure systems for taking and plashing fluid, the each pulling/pushing pressure system has a check valve and a reciprocal pump by the wave energy or electrical energy based on wave or solar energy, the purification subsystem has a mechanical purification structure and a thermal purification structure, the thermal purification structure has a distilling cover assembly, the distilling cover assembly has a transparent condensing cover, dark heated metal plate powered by solar power or electrical heaters, and multiple spray nozzles powered by the pulling/pushing pressure system, while thermal purification structure has the pre-turbine filter, the filter has three layers with various filleting sizes and three magnetic/nonmagnetic blades disposed in front of each filter layer to remove buildup on the filter layer surface and generate centrifugal force to increase intake fluid pressure, the novel reverse osmosis/forward osmosis filter not only provide fresh water through the reverse osmosis filter,but also constantly release salt through the forward osmosis filter and prevents fouling and prolongs the reverse osmosis filter life, finally a pressure relief valve is used to backwash the buildup salt as well as to release water when it is used to collect spill oil, so there is no pressure loss in the process unlike the conventional process by releasing brine, and the post-filter can be used to further remove or add other chemical elements.

Accordingly, besides objects and advantages of the present invention described in the above patent, several objects and advantages of the present invention are:
(a) To provide a desalination station without brine disposal process, such a station has a localized processor and continually releases salt or brines at very small amount of salt and is the most environmentally friendly desalination station.
(b) To provide a self-sustainable desalination station based on renewable energy, so the station can be directly or indirectly fully powered by a wave or solar energy and deportable to any remote seawater or brackish sites, and the developed and undeveloped countries.
(c) To provide a movable desalination station, so the station can move to a designated locations and fetch with GPS or digital cloud guides for military or commercial applications.
(d) To provide a versatile water purification station, the station not only can desalinate seawater, brackish or brine, but also can remove unwanted fluids or solids like oil spill or chemicals from water.
(e) To provide an efficient filter, such a filter can provide various size filtering layers and blades the blades can be constructed by a magnetic and nonmagnetic materials, so the blades not only remove buildup on the surface of filter layers, but also generate centrifugal forces to remove high density materials.
(f) To provide a desalination station at low cost, such a desalination station has the lowest cost of constructions and operations, the desalination station can constructed with a simple, low cost and robust structure, it can be retrofitted with existing desalination station as well as replace an desalination plant or and can be deployed to coastal area.
(g) To provide a highly efficient desalination station, so such a desalination station can be operated by much less energy and can produce fresh water with less carbon emissions and energy.

Still further objects and advantages will become apparent from study of the following description and the accompanying drawings.

DRAWINGS

Drawing Figures

Figure 2:
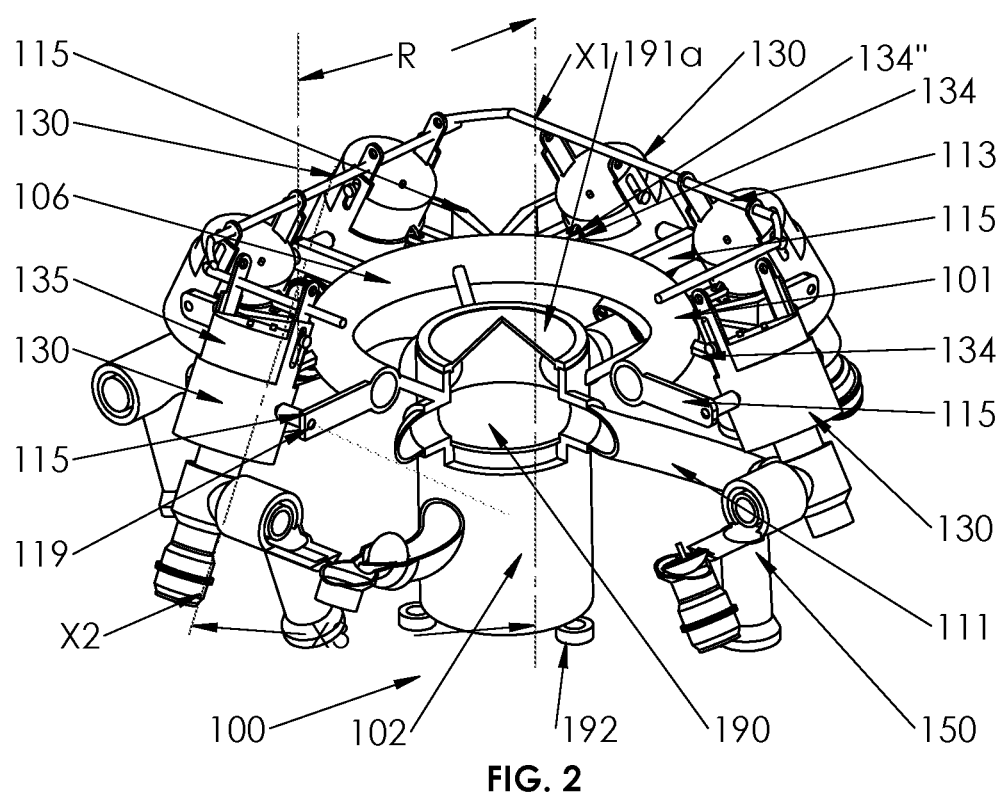
Figure 13:
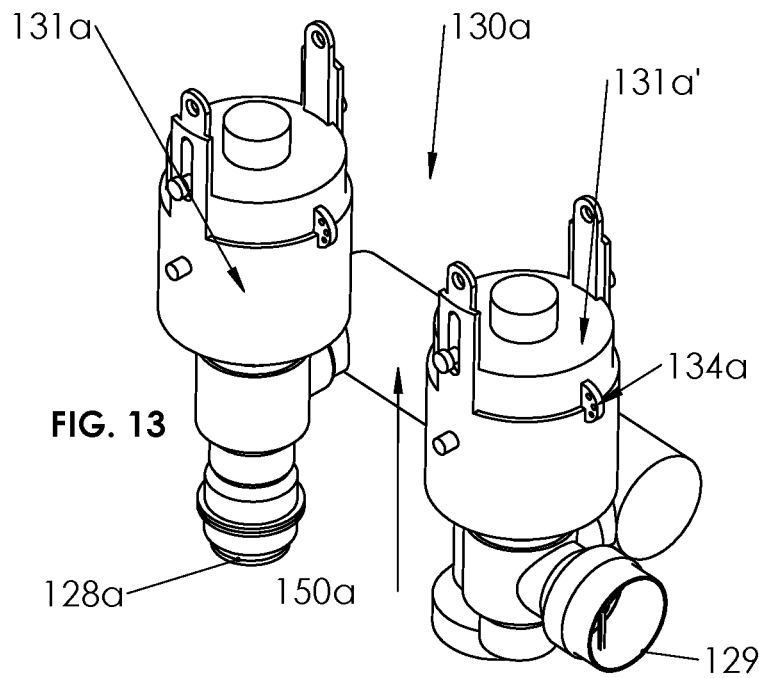
Figure 14:
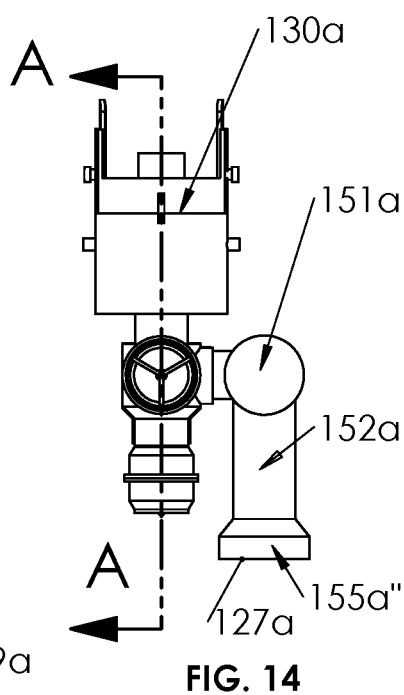
Figure 16:
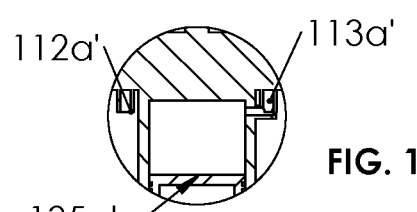
Figure 17:
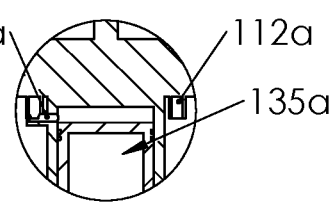
Figure 15:
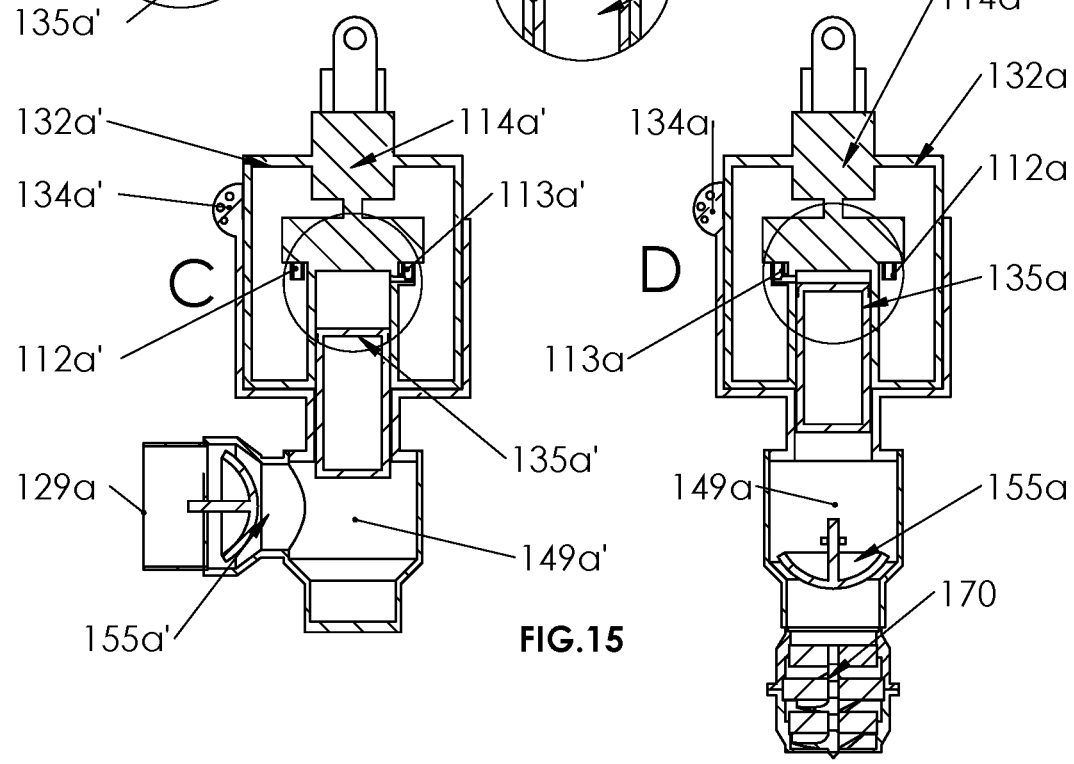
Figure 26:
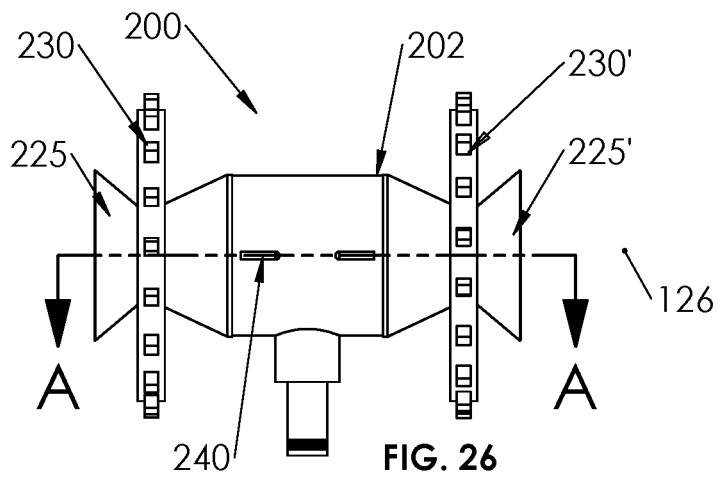
Figure 29:
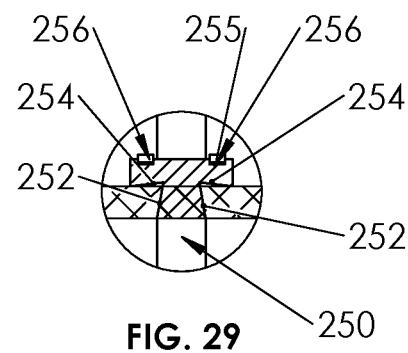
Figure 27:
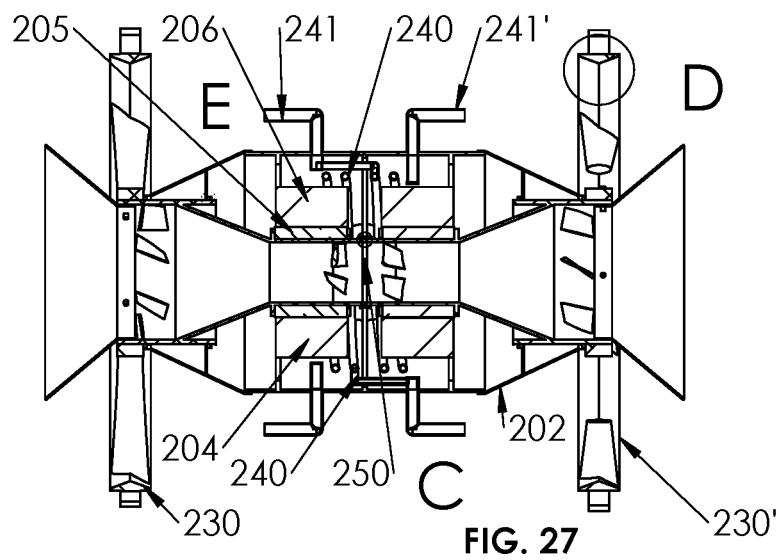
Figure 30:
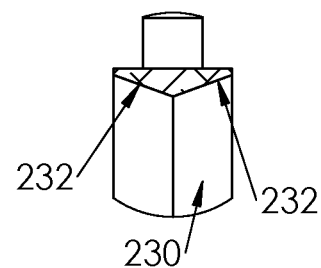
Figure 28:
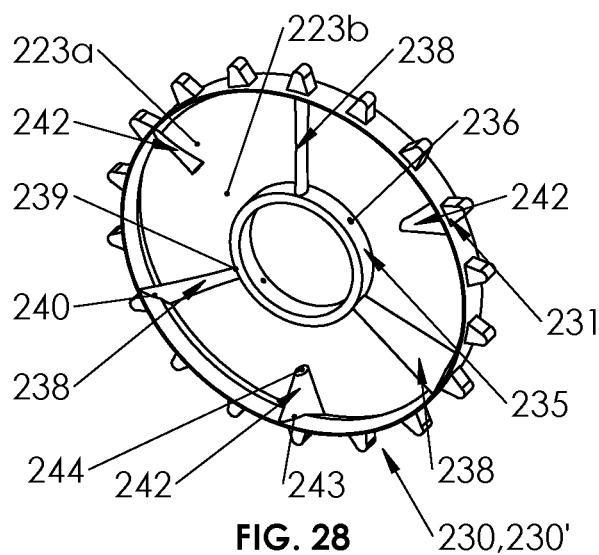
Figure 31:
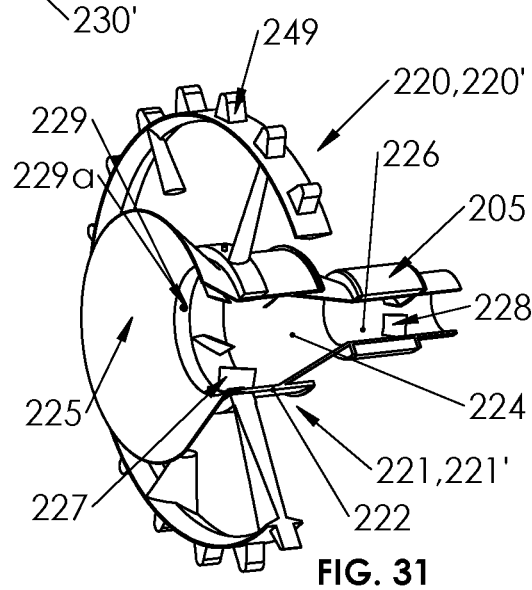
Figure 32:
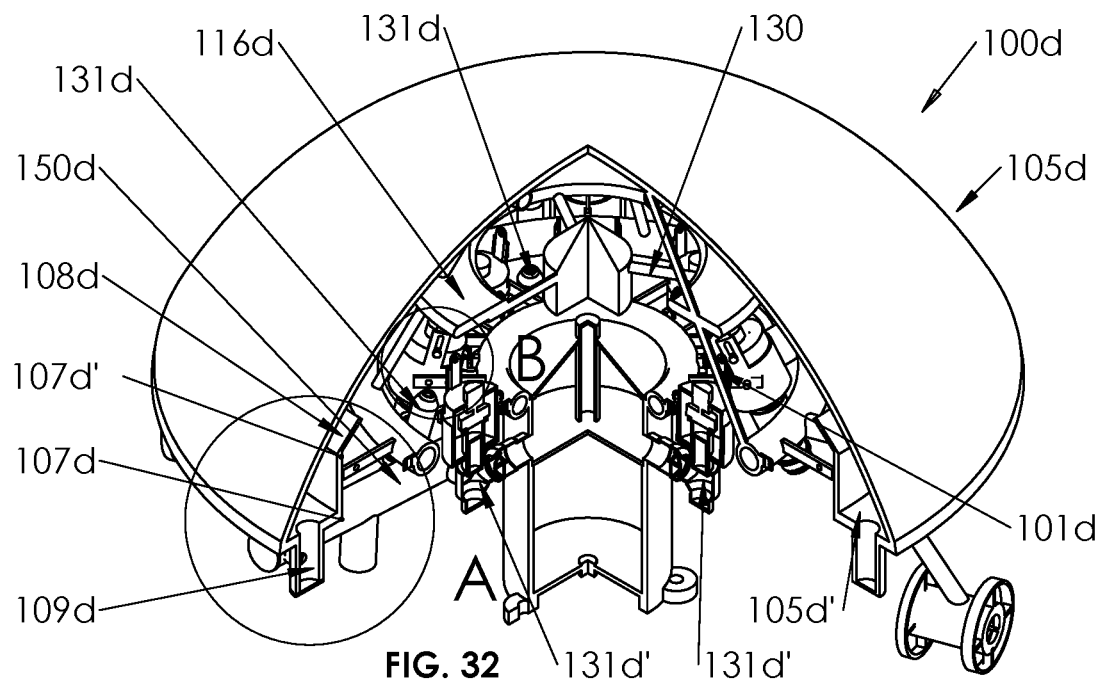
Figure 33:
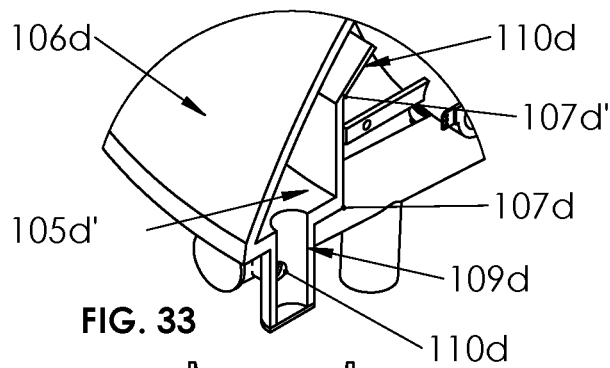
Figure 34:
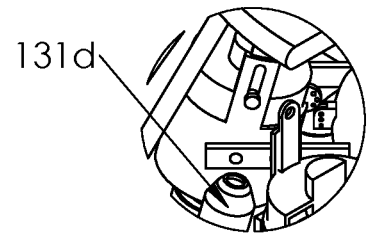
Figure 36:
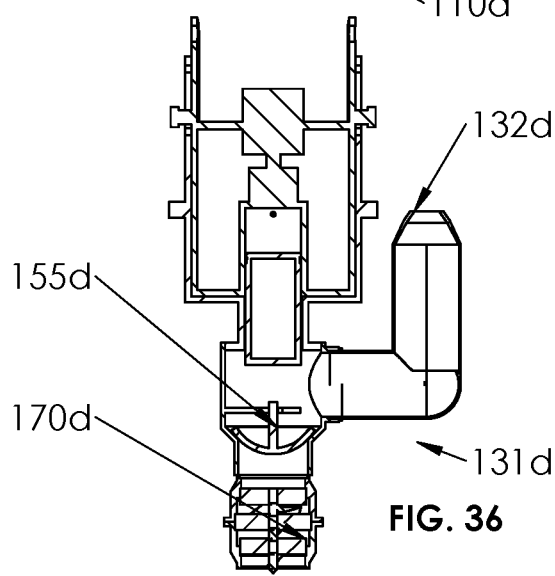
Figure 35:
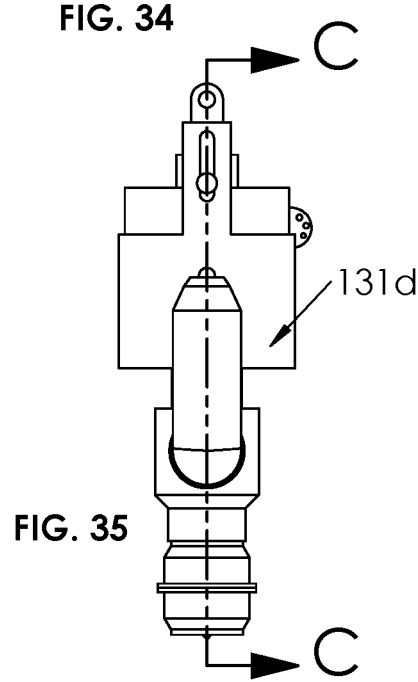
Figures 37, 38, 39, 40, 41, 42:
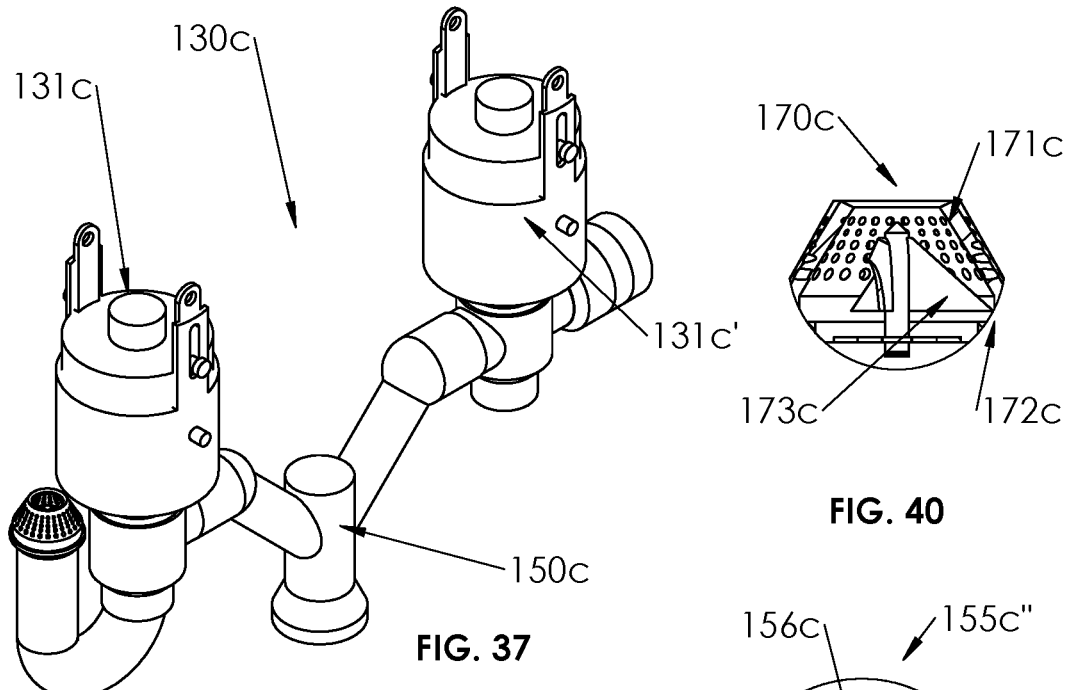

FIG. 1 is an ISO cut view of a renewably -powered desalination station constructed in accordance with this invention.
FIG. 2 is an ISO cut view of a wave-powered desalination station based on FIG. 1
FIG. 3 is an ISO view of a pump/filter subsystem of FIG. 2
FIG. 4 is a top view of the pump/filter subsystem of FIG. 3
FIG. 5 is a cross sectional view of the subsystem of FIG. 4 along with line E-E.
FIG. 6 is a "J" detail view of a turbine filter of the subsystem of FIG. 4
FIG. 7 is a cross sectional view of the subsystem of FIG. 4 along with line F-F.
FIG. 8 is a top view of the system of FIG. 3
FIG. 9 is a cross sectional view of the subsystem of FIG. 9 along with line F-F.
FIG. 10 is a "F " detail views of check valve of the subsystem of FIG. 4
FIG. 11 is a "J " detail views of check valve of the subsystem of FIG. 4
FIG. 12 is a cross sectional view of subsystem of FIG. 4 along with line F-F.
FIG. 13 is an ISO view of a pump/filter subsystem of FIG. 1
FIG. 14 is a side view of the subsystem of FIG. 13
FIG. 15 is a cross sectional views of the system of FIG. 14 along with line A-A.
FIG. 16 is a "C " detail views of pump/filter subsystem of FIG. 15.
FIG. 17 is a "D " detail views of pump/filter subsystem of FIG. 14.
FIG. 18 is an ISO view of a floater assembly of the desalination station system of FIG. 1
FIG. 19 is a "J " detail views of hinge of the subsystem of FIG. 18.
FIG. 20 is a top view of a pump/filter subsystem of FIG. 1
FIG. 21 is a cross sectional views of the subsystem of FIG. 20 along with line A-A.
FIG. 22 is a "B " detail views of pump of the subsystem of FIG. 15.
FIG. 23 is a "D " detail views of turbine filter of the system of FIG. 14.
FIG. 24 is a "E" detail views of a pump of the system of FIG. 15.
FIG. 25 is a "C " detail views of turbine filter of the system of FIG. 14.
FIG. 26 is a front view of a wave turbine of FIG. 1
FIG. 27 is a cross sectional view of turbine system FIG. 26 along line A-A.
FIG. 28 is an ISO view of a bladed turbine wheel of FIG. 27.
FIG. 29 is a "C" detail view of a seal ring of the system of FIG. 27.
FIG. 30 is a "D " detail views of blade of the system of FIG. 27.
FIG. 31 is a ISO cut view of rotor assembly of FIG. 27.
FIG. 32 is a ISO cut view of turbine assembly system of FIG. 27.
FIG. 32 is an ISO cut view of a thermal desalination station based on FIG. 1
FIG. 33 is a "A" detail views of turbine filter of the system of FIG. 33.
FIG. 34 is a "B" detail views of turbine filter of the system of FIG. 33.
FIG. 35 is a side view of a pump of FIG. 33.
FIG. 36 is a cross sectional view of turbine system FIG. 38 along line C-C.
FIG. 37 is an ISO view of an oil spill removing system based on FIG. 1
FIG. 38 is a top view of oil spill removing system of FIG. 38
FIG. 39 is a cross sectional view of the system FIG. 39 along line A-A.
FIG. 40 is a "E " detail views of turbine filter of the system of FIG. 40.
FIG. 41 is a "C " detail views of gravity releasing filter of the system of FIG. 40.
FIG. 42 is a ISO view of a blade turbine system FIG. 40

DESCRIPTION

Referring FIGS. 1, a hybrid-powered desalination/water purification station 100*a* includes a mooring assembly 101*a* defined by a center line X1, a solar energy converter with multiple forms including a solar panel 105*a* and a solar thermal cover assembly 105*d*, multiple pump/purification assemblies 130a respectively defined by a center line X2 and a delivery assembly 299 having four legs assemblies 201 and a control box 107a, the mooring assembly 101a has floaters 106a, 106a', a water tank 102a with an access port 103a, a fine filter 190a, a tank cover 191a and anchor joints 192a, the mooring assembly 101a has a joint hinge/pin assembly 119a/118a and a position hinge 134a respectively to position the pump/purification assemblies 130a.

Referring FIGS. 2, a wave-powered desalination/water purification station 100 has a mooring assembly 101, an equalized rope 113, multiple pump/purification assemblies 130, each of the multiple pump/purification assemblies 130 has an intake pumping assembly 131, an output pumping assembly 131' connected with each other through the equalized rope 113 for equalizing wave forces on the pump/purification assemblies 130, the mooring assembly 101 has a water tank 102, a fine filter 190 installed in the water tank 102, a tank cover 191 disposed on the water tank 102 and four flexible hoses 111 to provide connections between the pump/purification assemblies 130 and the water tank 102, the mooring assembly 101 defined by a center line X1 has an internal floater 106 and an external floater 106a and anchor joints 192 and pivot hinge/pins 134 for engagement between the pump/purification assemblies 130 defined by a center line X2 and the mooring assembly 101 defined by a center line X1 and a position hinge 134 to define a tilt angle X3 between the floater assembly 101 and the pump/purification assemblies 130 for maximizing wave energy efficiency by amplifying wave centrifugal forces, each pumping assembly 131,131' has a piston 135,135', so an average chord/2=C=R, so the centrifugal force F=Mass * V^2/R3, R3 about (C/cosX3), the mass of piston 135 is Mass, V is the wave velocity, the gravity Fl =Mass *g *cos X3, so F would move the piston 135 up at a top of the wave of seawater with R3 and return the lowest point of the wave of seawater with R3, g=gravitational acceleration, so total force, F−F1=Mass (V^2/R3−g*cosX3) for pumping up, and F+F1=Mass (V^2/R3+g*cosX3) for pumping down, so the pivot hinge/pins 119 and the tilt angle X3 with the position hinge 134 is the heart of this centrifugal force amplification to take full advantage of the wave energy, the intake pumping assembly 131 and the output pumping assembly 131' are defined by a positive displacement pumping mechanism, which is the best and the most efficient application for high pressure with 60 bar and up with relatively small volume, so for the first time, this wave-powered positive displacement pump is only a pump that only produce high pressure pump directly powered by wave energy without any conversion in the most efficient way, that no conventional pump in the world can operate, and can be used in the undeveloped countries or remote areas where the electricity is unavailable as well as in the developed countries, where carbon mutual and renewable energy usage are mandatory requirements or preferred method, so the applications are unlimited.

Referring FIGS. 2-12, each of the pump/purification assemblies 130 has the intake pumping assembly 131 with an inlet 128 and the output pumping assembly 131' with an outlet 129 and a purification assembly 150 placed between the intake pumping assembly 131 and the output pumping assembly 131' by means of pins 119 and bushings 118 with the tilt angle X3 which is to match with the feature of the wave. The intake pumping assembly 131 has a cylinder 132 with two slots 133 or 133', a position hinge 134, 134' respectively positioned between each of the pump/purification assemblies 130 and the floaters 106,106', and a piston 135 or 135' with two hinge pins 117 movably disposed in the cylinder 132, so two hinge pins 117 are engaged respectively with two hinges 133 to restrict linear movements of the pistons 135, 135', the pistons 135,135' are filled with water or sands to increase mass, the piston 135 has two rope holes 137 to receive the rope 113 to equalize pulling or pushing forces powered by wave energy, the intake pumping assembly 131 has a low chamber 135 extending to the purification assembly 150 and to a check valve 155 to control fluid direction, a turbine filter 170 connected with the cylinder 132 to filter intake fluids, the turbine filter 170 has a housing 171 and three filter layers 173,173',173" and three blades 172,172',172" to filter out solid particles and to remove buildups on the filter layers 173,173',173", while the check valve 155,155' has a segment ball 156 with a pin 157, a seat 159 engaged with the segment ball 156 for seals, and a guide plate 158 to guide the pin 157 for control fluid directions, the output pump assembly 131' has an inlet chamber 149' and a check valve 155, extending to the water tank 102 through the fine filter 190, while the purification assembly 150 has a T shape body to receive a reverse osmosis filter 151, a forward osmosis filter 152 and a pressure relief valve 155" with a spring 199, so under pressures the forward osmosis filter 152 would release buildup salts, while the pressure relief valve 155" is designed to backwash salt buildup if working pressure reach a limit due to salt buildup, so as pull-wave pushes the intake piston 135 to move up and sucks fluid through intake filter 170 with the check valve 155 at an open position into an inlet chamber 149, while pull-wave pulls the output piston 135' to move up, the output pumping assembly 131' sucks the fluid in the inlet chamber 149 through the reverse osmosis filter 151, on the other hand, as push-wave pushes the intake piston 135 to moves down, and pressurizes the fluid in the inlet chamber 135 with the check valve 155 at a closed position through the reverse osmosis filter 151 to release fresh water into the outlet chamber 149', while the push-wave pushes the output piston 135' to move down with the check valve 155 at an open position and pumps out the fresh water into the water tank 102 through flexible entry hose 111, while the forward osmosis filter 152 release the salts when the seawater is pressurized, the push/pull pumping mechanism is not only the most efficient wave pumping to provide fresh water in the world but also the simplest and the most robust pump with low cost, the unique method is designed to remove salt buildup with the relief valve 150" when the filtering pressure reach at a preset limit, so the impact of sudden pressure drop shakes the reverse osmosis filter 151 against the salt buildup on the internal surfaces of the reverse osmosis filter 151, the expanding and contraction process would not only reach the highest clearness beyond any existing clearing method if such a method is existing, but also greatly reduce maintenance and replacements and prolong the filter service life.

Referring FIGS. 1 and 13-25, the hybrid-powered desalination/water purification station 100a has the mooring assembly 101a and multiple pump/purification assemblies 130a, the mooring assembly 10a has the floaters 106a, 106a' and 106a" to provide the buoyant forces for the station 100a, and position hinges 112a and angle position hinges 114a to control positions and angles of pump/purification assemblies 130a, each of the pump/purification assemblies 130a has an intake electrical gear pumping assembly 131a with inlet chamber 149a and an output electrical gear pumping assembly 131a' with an outlet chamber 149a' and a purification 150a placed between the intake electrical gear pumping assembly 131a and the output electrical gear pumping assembly 131a', the intake electrical gear pumping assembly 131a has a check valve 155a, a cylinder 132a filled with fluid, an electrical gear pump 114a disposed in cylinder 132a, with a fluid inlet 112a, outlet 113a between cylinder 132a and electrical gear pump 114a. So there are two sets of operations push/push wave—pull/pull wave, push/pull wave-pull/push wave operations, since the push/push—pull/pull pumping mechanism was explained above, here just for the push/pull wave-pull/push wave operations, as the electrical gear pump 114a is energized to suck the fluid in the cylinder 132a from port 112a to port 113a and push the piston 135a down with the check valve 155a at a closed position and pressurize fluid in the inlet chamber 149a through the reverse osmosis filter 151 into the output chamber 149a', while the electrical gear pump 114a' is energized to move fluid in the cylinder 132a from port 113a' to port 112a' and move a piston 135a' up and suck in fluid into the inlet chamber 149a through the reverse osmosis filter 151 into the output chamber 149a' when the check valve 155a at a closed position, on the other hand, as the electrical gear pump 114a energize to pump out the fluid in the cylinder 132a from port 112a to port 113a and pull the piston 135a up with the check valve 155a at an open position and suck fluid in the inlet chamber 149a through the intake filter 170, while the electrical gear pump 114a' energize to suck fluid in the cylinder 132a from port 113a' to port 112a' and moves the piston 135a' down with the check valve 155a' at an open position and pump out fresh water into the outlet chamber 149a' into the water tank 102 through flexible hose 111, so the push/pull — pull/push process generate a double pressure difference, if the 870 psi or 60 bar pressure is used for the process filter 105a, then each pumping assembly 131a' or 131a only needs to produce 435 psi or 30 bar, the operation theory is applicable for an opposite operation, so the whole pumping pressure system rating decrease by 50%, this will not only increase the filter life greatly, but also make manufacturing much cheaper and simpler.

Referring FIGS. 1 and 26 to 31, the delivery subsystem 299 has four legs assemblies 201 and solar penal 105a connected with the mooring assembly 101, each of leg assemblies 201 has a wave turbines 200 having a body assembly 202, two generators 204 and two rotor assemblies 220 respectively movably disposed in the body assembly 202 in an opposite direction for generating electricity and providing rotary movement, a T seal ring 250 disposed between two rotor assemblies 220,220' for seals, T seal ring 250 has v seal section defined by two axially conical surfaces 252, a two radially conical surfaces 254 and two spring grooves 255, two springs 256 respectively disposed in the groove 255 for preloading and compensating wear, each modular rotor assemblies 220 has an end 126 having a mated surface engaged with the surface 252 of T seal ring 260, each of generators 204 has an electrical rotor 205 disposed on the rotor assemblies 220 and an electrical stator 206 disposed on the body assembly 202 against the rotor 105 for generating electrical power, the body assembly 202 has two water cooling coils 240 with two end openings 241, 241' to circulate fluids between inside and outside of body assembly 202 for cooling two generators 204, each modular rotor assembly 220 has a bladed ring 230, a tubing assembly 221 and a nozzle 225, according to Bernoulli equation, an incoming fluid speed would increase as the diameter of nozzle 225 becomes smaller. The tubing assembly 221 has a tubing 222 with blades 227 expending to a smaller tubing 226 with blades 228 through a conical tubing 224, so the incoming fluid speed increases and further rotate the tubing assembly 221 and power the tubing assembly 221 through blades 227, 228, then into the tubing assemblies 221' in an opposite direction, the incoming fluid would push the tubing rotor assemblies 220' in an opposite rotation, as the incoming fluid passes the small tubing 226 to power the tubing rotor assembly 220' through blades 228,227 and gradually reduce the speed as the areas of tubing 224 increase, as tubing 222 become larger and larger, the pressure gradually increase to power the tubing rotor assembly 220' and enter into the nozzle 225 and release the incoming fluid.

The bladed rings 230, 230 are respectively disposed in a front of the tubing assemblies 221, 221', each of bladed rings 230 has two radial sections, a high energy section 232a with three short blades 242, three long blades 238 for generating most fluid power and a low energy section 232 with three blades 238 for releasing most used fluid, the bladed ring 230 has a modular root ring 235 and a tip "V" shape modular ring 231 defined by two internal surfaces 234, and three long blades 238 structured between the rings 231 and the ring 235, three short blades 236 are structured with the tip ring 234 in the high energy section 132a, each blade 238 is defined by a airfoil cross section and a small root section 239 and a large tip section 240, each short blade 242 is defined by a airfoil cross section and a small root section 244 and a large tip section 243, so the high energy section 232a and low energy section 232 b are divided radially to reach the optimized efficiency, so in the high energy section 232a, there are six blades 242,238 with large mass and larger radius of bladed ring 230 with centrifugal forces, so the rotor assembly 220 can generate more power in high energy section 232a than that in the low energy section 232b, where there are only three blades with much smaller cross sections, even area of low energy section may be equal to area of high energy section, but the amount of energy generation in each section is not equal, the angular division method for the current blade design has a very short period for the peak value and indiscriminately cut off area of high energy fluid and low energy fluid, while radial division method for the bladed ring 230 divides the incoming fluid into the high energy section and low energy section, the blades 242 and 238 generate maxim torques in the high energy section 232a and release used fluid in low energy section due to the conservation of mass, so the bladed ring 130 not only increases the strength of the blades 238, 242 as an integral structure, but also reduces material, vibrations and tip eddies. The two bladed rings 231 arrangement greatly improves the performance by eliminating the tip eddy and greatly reducing the vibration of the rotor assembly 220, wake turbulent as well as the noise, in addition if loads pass a designed limit, each blade 234 has a root joint 235 which would be broken to protect rotor assembly 220,220' as a third safety barrier, the tubing assemblies 221, bladed ring 130 and nozzle 225 have four joint holes 229 and four safety pin 229a respectively inserted into four joint holes 229 for securing the joints as a four safety barrier, if loads pass a designed limit, the safety pin 229a would be broken to protect tubing assembly 221', 221 and the body assembly 202, so according to Bernoulli equation ,when the incoming fluid passes through bladed ring 230, first the rotor assembly 220 would generate a vortical flow due to the pressure gradient between a center flow in the tubing assembly 221 with the conical nozzle 225 and the tip ring 231, the rotates rotor assembly 220 clockwise and the rotor assembly 220' anticlockwise due to opposite blades twist angles between bladed ring 230 and 230', so the vortical flow constantly sucks more fluid without blade tip leaks and blocking area in the center of the tubing assembly 221 than that the swept area bladed ring 231 covers, this is a main reason why the tubing rotor assembly 220 can pass the Betz limit and becomes the so efficient, the fluid outside the nacelle assembly 102 generates three dynamics streams between the bladed rings 230,230', because the rotor assembly 220', 220 have two set opposite blades 238,242 in an opposite direction, those three dynamics streams become three much rigid dynamic wind tunnels between the rotor assembly 220, 220' according to Newton's third law and generate more power than single rotor can do.

Referring FIGS. 32 to 36, a hybrid-powered desalination/purification station 100d submerged in seawater has multiple pump/purification assemblies 130 for mechanical purifications and the solar thermal cover assembly 105d and multiple pump/purification assemblies 130d for solar thermal purification, and a mooring assembly 101d, the solar thermal cover assembly 105d has a transparent condensing cover 106d with a water collector 108d defined by a low submerged line 107d and a high submerged line 107d' and a protect cover 110d and multiple adapter 109d with a link port 110d and a dark metal plate heater 116d, so the desalination/purification station 100d can create a vacuum condition between the seawater and the condensing cover assembly 105d, the property of triple point of the water show us that if the water is under vacuum condition or closed to vacuum condition, the water would evaporate at much lower temperature rather than 100 C with much less energy, in addition, the dark metal plate heater 114d is designed to absorb most of solar energy from the condensing cover 108d over the seawater, and also can be heated by electrical heaters or both, the each of pump/purification assemblies 130d has an output pumping assembly 131d' to pump the condensing water in the adapters 109ds into the water tank 102, an intake pumping assembly 131d, intake turbine filter 170d, the intake pumping assembly 131d is designed to suck the seawater and spray it with a nozzle 132d, so it would accelerate the forced evaporation much faster than any natural evaporation, according to conversation of energy and thermodynamics and heat exchange, this solar purification structure cover all conduction, convection and radiation and conduction with addition heat loss on the dark metal plate heater 116 and is the most efficient process over all thermal desalinations, the hybrid-powered desalination/purification station 100d overcome the weakness of solar and wave power, so during the daytime, the solar power would play a role either for thermal distilling or generating electricity to charge the battery and the wave power plays a role for directly powering the pumping subsystems 130 and generating electricity to charge the battery, while during night time, the wave power would continue to power the station directly or indirectly and produce fresh water, for the simple version, the station 100d can be built without the pump subsystem 130, and connected with said entry hoses of the tank 103a, the tank 103a has the access port 103a having the gravity relief valve 155c, so it can provide a connection between the tank 103a and a land water collector, so the gravity relief valve 155c can provide both vacuum conditions and a transport port between the station and the land water collector.

Referring FIGS. 37 to 42, a pump/purification assembly 130c is used to remove spill oil in ocean and river, the pump/purification assembly 130c has an intake pumping assembly 131c with the check valve 155, an output pumping assembly 131c' with the check valve 155 and a purification assembly 150c, the purification assembly 150c has a Y shape body with an intake filter 170c, a gravity relief valve 155c" between the intake pumping assembly 131c and the output pumping assembly 131c' has a with an outlet 127c, the gravity relief valve 155c" has a guide plate 158c, a spring 199, a segment ball 156c engaged with a seat 159c for seals, the segment ball 156c has a pin 157c a guide by the guide plate 158c and biased by the spring 199 to control release pressure based on the % content of water, the pre-filter assembly 170c has a housing 171c, a conical filter 171 installed in front and a bladed 172c disposed in the a conical filter 171 to generate centrifugal forces as fluid flow in the pre filter assembly 170c to remove water from the oil, while there are a pressure difference between output 129c and bottom surface 127c, because Pressure under water =weight density x depth (H), so the spring 199 is designed to hold pressure based on oil density, if collected oil includes high percent water in the middle filter 151c, then the relief valve 155c" would open and release the bottom water, the pump/purification assembly 130c is designed to remove oil from oceans and rivers by using centrifugal forces and gravity forces, so as pistons, 133c, 133c' move up and suck in oil, and pistons 133c, 133c' move down and pump out oil into the tank 102a, the pistons 133c, 133c' movements are powered by wave power or electrical power, so under GPS guide, the pump/filter assembly 130c can be deported to spill oil area and propelled by the delivery subsystem 299 to remove spill oil or other chemical fluids.

Although the description above contains many specifications, these should not be construed as limiting the scope of the invention but as merely providing illustration of some of the presently preferred embodiments of this invention.

Thus, the scope of the invention should be determined by the appended claims and their legal equivalents, rather than by the examples given.

CONCLUSION

1 High Performance

This quintessential American turbine technology which bring down all barriers no existing technologies can and provides the best performance with the lowest cost ever among all existing desalination/purification processes (1) the station is directly and indirectly powered by renewable wave or solar energy power sources sustainably (2) the wave push and wave pull pumping systems are the most reliable, robust, and compact systems capable of replacing all conventional pumping system and can be deportable to remote area or underdeveloped countries where the electricity is unavailable or to the developed countries where autonomous operations are operable (3) the efficient pressure is generated by the wave energy, it can generate 1500 psi or push-pull pressure system by pushing system A and pulling system B, so the system only requires half the working pressure. Total pressure=pushing pressure/2-(-pulling pressure/2)=pulling or pushing pressure (4) The filter system includes the pre-turbine filter, the desalination filter and the post filter, the pre-filter includes three magnetic blades, which not only remove buildup on the filter layer surface, but also generate centrifugal force with turbines to increase intake fluid pressure and remove solid particles, the desalination filter includes reverse osmosis produces fresh water by removing slats and backwash slats with pressure relief valve and the gravity relief valves to release salts with the most efficient method and play a key role to reduce cost and along with forward osmosis removes salts out and prevent the filter from fouling. The post filter includes some chemical elements for healthy drinking water (5) versatility and deployability, the station is very versatile and can be deployed to offshore water or brackish area, and be anchored and then the wave turbine/propeller is used for generating power and delivering fresh water. Once the tank is fully filled with fresh water, the wave turbine/propeller can move the station to close to land pumping stations, then the water would be delivered to the water distribution system or pumped to a water tower, if the underground water is much deep, the four propeller/wave turbine would be replaced by four foldable motored legs, one or two intake pumps installed in the wells in series, and additional solar panel or wind turbine around the pumping station may be needed, each desalination station is controlled by a robotic control box and guided by GPS. Finally this station can be used for removing oil spill by replacing the desalination filter with a gravity relief valve 2 Low Costs of Construction and Operation The modular desalination stations or farms reduce (1) construction cost by eliminating the facility cost by 35 to 50% of the cost, there are no factory facility constructions, water reservoir, pumping station to pump in the seawater and release brine and low initial investments (2) scalability, High scalability is based on the modular design for a single part, single station or desalination farm, they are all scalable, the modular design of the station can reduce inventory, tooling and design cost, as the demand increases, for an example 5000 GPD station can be made with multiple 100 GPD X 50 stations, 500 X 10 GPD stations, and 1000 X 5 GPD stations, as the demand increase, the more modular stations can be added unlike the fixed capability of the conventional desalination plants (3) Economics of scale, as number of modular station increase, the cost would reduce unlike the conventional desalination plants, the cost as well as levelized cost of water would be reduced as the number of parts produced increase from one to 24 or 48 or 100 (4) No transportation cost, intake waters are pumped in where the seawaters or brackish waters are located and the fresh water would be delivered to land water station of water tower to add to water disturbing system (5) Lower operation cost, there are no transporting cost as well as brine disposal costs or energy cost, and the only cost would be membrane replacement and delivery cost, which the conventional desalination plants also have, as a result, the cost would be much less at 30%, each station can be deported closely to the end users rather than centralized system, if additional water over the usage can be added to city water distribution system for other location, the decentralized system become new business for 21 first century models.

4 Universal Applications

This water purification station provides the universal applications no existing method can cove, this station can be deported to anywhere either the developed countries or the undeveloped countries, either areas with electricity or areas with electricity, for scale aspects, it covers from a personal water purifier to industrial scale water purification farms from 1 gallon to 100 MGD capability, as far as the salinity levels are concerned, the station can purify the brine water with 50+ppt by using solar thermal purification structure, the saline water with 30-50 ppt by using both mechanical and thermal purification structures and the brackish water with 0.5 to 30 ppt by using the mechanical structures, furthermore it can be used to purify a fluid from other fluid like spill oil in oceans or rivers based on the different fluid special gravities, and is better than any exiting methods from skimmers to dispersant in term of cost and efficiency. They can be used as ocean-survival kits, so if sailors or fishmen fall in the ocean with water and electricity on this station unlike any other lifeboats, they would produce water and electricity survive for long time to ask for help and move to a closed island, finally it can be used as a manual water purifier with the pumping assembly and the filter and a vacuum solar thermal water purifier.

5 The Future of Innovation of the Sstation

Can we, human survive with water scarcity? Of course we can, once up a time, we had the same problem, but we survived, because we have insatiable desires to overcome limits, regardless human or nature by inventing the car to overcome our leg limit, by inventing the telescope to overcome our eye limit, by building bridges to overcome river limits, stay tone.

I claim:

1. A fluid purification system has stations each of said stations has at least one of plurality of subsystems including (1) a mooring subsystem (2) at least one wave pumping subsystem (3) at least one electrical pumping subsystem (4) at least one mechanical purification subsystem (5) a thermal purification subsystem (6) a delivery subsystem, said mooring subsystem defined by a center line has a tank having entry hoses, access ports, and fixed position hinges, multiple arms, each of said multiple arms has at least one pivot hinge assembly the at least one wave pumping subsystem has a wave energy converting unit which has a cylinder assembly having at least one inlet, and at least one outlet and at least one arm joint engaged with the at least one pivot hinge assembly and a position joint engaged with one of said fixed position hinges for defining a tilt angle between said mooring subsystem axis and the at least one wave pumping subsystem, and generating centrifugal forces, a piston assembly movably disposed in said cylinder assembly, a check valve connected with the at least one inlet of the at least one wave pumping subsystem to define a cavity for generating a pull-pull and push-push pumping cycle, said piston assembly has two linear hinge pins, and is powered by wave energies, said cylinder assembly has at least one rope hole and two hinge ears to respectively receive said linear hinge pins of said piston assembly for guiding linear movements of said piston assembly, said check valve has a disc having a guide pin and a spring disposed in said guide pin and a pin holder with said cylinder assembly to receive said guide pin and a seat biased by said spring, said disc is defined by one of plurality of shapes including spherical shapes, conical shapes and flat shapes, the at least one electrical pumping subsystem has an electrical pump assembly, a cylinder assembly having at least one inlet, and at least one outlet, a piston assembly movably disposed in said cylinder assembly, a check valve connected with the at least one inlet of the at least one electrical pumping subsystem to define a cavity for generating one of plurality cycles including a pull-pull and push-push cycle and a pull-push and push-pull cycle, said piston assembly is powered by said electrical pump assembly disposed between said piston assembly and an outside fluid reservoir, said check valve has a disc having a guide pin and a spring disposed in said guide pin and a pin holder with said cylinder assembly to receive said guide pin and a seat biased by said spring, said disc is defined by one of plurality of shapes including spherical shapes and conical shapes, flat shapes, the at least one mechanical purification subsystem has a body having an inlet port, an outlet port and a relief port, said body has one of plurality of shapes including shapes, and Y shapes, and at least one of plurality of parts including a reverse osmosis filter, and a relief device having one of plurality of types including a forward osmosis filter and a relief valve, said relief valve has a housing, a disc having a guide pin and a spring disposed in said guide pin and a pin holder with said cylinder assembly to receive said guide pin and a seat biased by said spring for a preset pressure limit, said disc is defined by one of plurality of shapes including spherical shapes, conical shapes and flat shapes, said thermal purification subsystem has a condensing cover assembly having a transparent condensing cover and a fluid collector defined by a low submerged line and a high submerged line and a protect cover and cover adapters and dark metal plate heaters, said delivery subsystem has multiple leg assemblies, each of said multiple leg assemblies has a turbine, said turbine has a body assembly, a left tubing rotor assembly, a right tubing rotor assembly, said left rotor assembly has a left external turbine wheel having an edge ring and a root ring, multiple blades between said edge ring and said root ring, a left tubing assembly having multiple set of internal blades, said left tubing assembly has a high power zone and low power zone defined by inside diameters of said multiple set of internal blades, said right rotor assembly has a right external turbine wheel having an edge ring and a root ring, multiple blades between said edge ring and said root ring a right tubing assembly having multiple set of internal blades, said right tubing assembly has a high power zone and a low power zone defined by inside diameters of said multiple set of internal blades.

2. The fluid purification system of claim 1, wherein a first of said stations has said mooring subsystem having at least one equalized rope, a first of the at least one wave pumping subsystem receiving the at least one equalized rope, a second of the at least one wave pumping subsystem receiving the at least one equalized rope and a first of the at least one mechanical purification subsystem disposed between said first of the at least one wave pumping subsystem and said second of the at least one wave pumping subsystem, said first of the at least one wave pumping subsystem has a turbine filter connected with the at least one inlet, said turbine filter has a housing, multiple filter layers disposed in said housing and multiple turbines sandwiching said multiple filter layers for removing buildups on said multiple filter layers, said first of the at least one mechanical purification subsystem has said reverse osmosis filter disposed between said inlet port and said outlet port, and said inlet port connected with the at least one outlet of said first of the at least one wave pumping subsystem, said outlet port connected with the at least one inlet of said second of the at least one wave pumping subsystem , said relief port to receive said relief device for removing buildups, said second of the at least one wave pumping subsystem has the at least one outlet connected with one of said entry hoses.

3. The fluid purification system of claim 1, wherein a second of said stations has said mooring subsystem a solar penal, a first of the at least one electrical pumping subsystem, a second of the at least one electrical pumping subsystem and said first of the at least one mechanical purification subsystem disposed between said first of the at least one electrical pumping subsystem and said second of the at least one electrical pumping subsystem, said first of the at least one electrical pumping subsystem has said turbine filter connected with the at least one inlet, said first of the at least one mechanical purification subsystem has said reverse osmosis filter disposed between said inlet port and said outlet port, said inlet port connected with the at least one outlet of said first of the at least one electrical pumping subsystem, said outlet port connected with the at least one inlet of said second of the at least one electrical pumping subsystem, said relief port to receive said relief device for removing buildups , said second of the at least one electrical pumping subsystem has the at least one outlet connected with one of said entry hoses.

4. The fluid purification system of claim 1, wherein a third of said stations has said mooring subsystem having a solar penal, a third of the at least one electrical pumping subsystem, a fourth of the at least one electrical pumping subsystem and said thermal purification subsystem disposed over said mooring subsystem, said third of the at least one electrical pumping subsystem has the at least one inlet connected with said turbine filter, a spray nozzle connected to the at least one outlet at an up position for spraying fluids, said spray nozzle has porous cover defined by one of plurality of shapes including conical shapes, spherical shapes and stepped conical shapes and a bladed turbine, said fourth of the at least one electrical pumping subsystem has the at least one inlet connected with one of said cover adapters and the at least one outlet connected with one of said entry hoses.

5. The fluid purification system of claim 1, wherein a fourth of said stations has said mooring subsystem having said solar penal, said delivery subsystem connected with said mooring subsystem, said first of the at least one wave pumping subsystem, said second of the at least one wave pumping subsystem, said first of the at least one mechanical purification subsystem disposed between said first of the at least one wave pumping subsystem and said second of the at least one wave pumping subsystem, said third of the at least one electrical pumping subsystem, said fourth of the at least one electrical pumping subsystem and said thermal purification subsystem disposed over said third of the at least one electrical pumping subsystem and said fourth of the at least one electrical pumping subsystem.

6. The fluid purification system of claim 1, wherein a fifth of said stations has said mooring subsystem having said solar penal, said delivery subsystem connected with said mooring subsystem, a third of the at least one wave pumping subsystem, a fourth of the at least one wave pumping subsystem and a second of the at least one mechanical purification subsystem disposed between said third of the at least one wave pumping subsystem and said four of the at least one wave pumping subsystem, said third of the at least one wave pumping subsystem has the at least one inlet and a suck nozzle connected to the at least one inlet at a up position, said suck nozzle has a porous cover having one of plurality of shapes including conical shapes spherical shapes and stepped conical shapes and a bladed turbine, said second of the at least one mechanical purification subsystem has said inlet port connected with said third of the at least one wave pumping subsystem, and said outlet port connected with the at least one inlet of said fourth of the at least one wave pumping subsystem and said relief port to receive said relief valve, said fourth of the at least one wave pumping subsystem has the at least one outlet connected with one of said entry hoses.

7. The fluid purification system of claim 1, wherein a sixth of said stations has said mooring subsystem having said solar penal , said delivery subsystem connected with said mooring subsystem, a fifth of the at least one electrical pumping subsystem, a sixth of the at least one electrical pumping subsystem and said second of the at least one mechanical purification subsystem disposed between said fifth of the at least one electrical pumping subsystem and said sixth of the at least one electrical pumping subsystem, said fifth of the at least one electrical pumping subsystem has the at least one inlet and a suck nozzle connected to the at least one inlet at a up position, said suck nozzle has a porous cover having one of plurality of shapes including conical shapes spherical shapes and stepped conical shapes and a bladed turbine, said second of the at least one mechanical purification subsystem has said inlet port connected with said fifth of the at least one electrical pumping subsystem, and said outlet port connected with the at least one inlet of said sixth of the at least one electrical pumping subsystem and said relief port to receive said relief valve, said sixth of the at least one electrical pumping subsystem has the at least one outlet connected with one of said entry hoses.

8. The fluid purification system of claim 1, wherein a seventh of said stations has said first of the at least electrical pumping subsystem, said first of the at least one mechanical purification subsystem having said reverse osmosis filters and said inlet port connected with said the at least one outlet of said first of the at least one electrical pumping subsystem.

9. The fluid purification system of claim 1, wherein an eighth of said stations has said mooring subsystem , said delivery subsystem connected with said mooring subsystem, said tank of said mooring subsystem has said relief valve connected with one of said access ports.

\* \* \* \* \*